No. 881,406. PATENTED MAR. 10, 1908.
H. JANSEN.
THREADING TOOL.
APPLICATION FILED MAY 20, 1907.
2 SHEETS—SHEET 1.
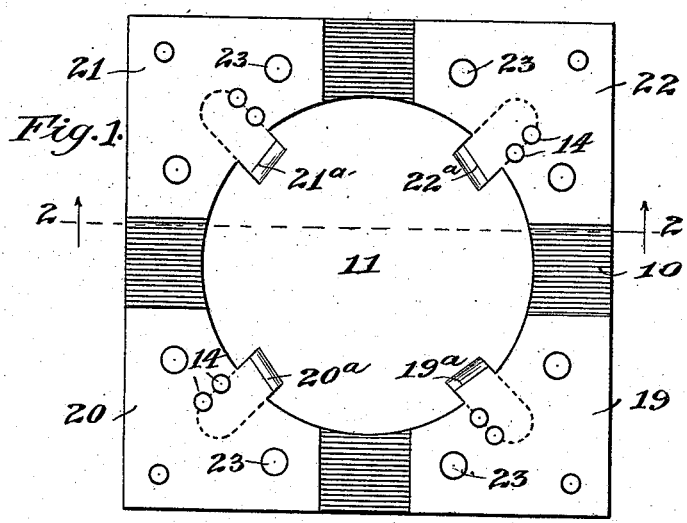
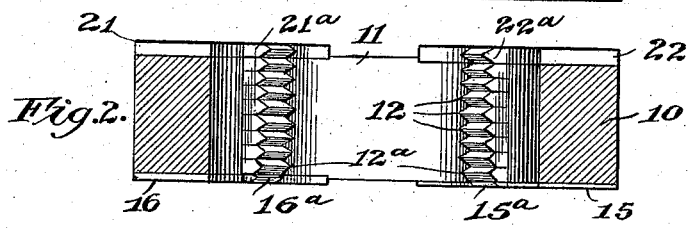
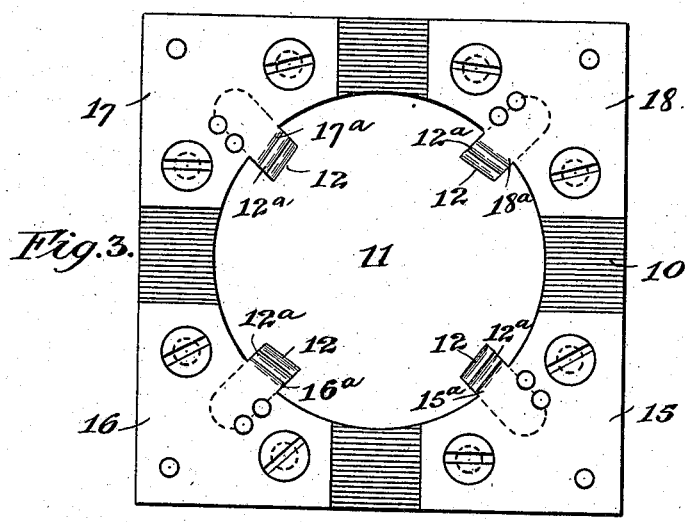
Witnesses,
Inventor,
Henry Jansen,
By Offield, Towle & Linthicum
Atty's.

No. 881,406.
PATENTED MAR. 10, 1908.
H. JANSEN.
THREADING TOOL.
APPLICATION FILED MAY 20, 1907.
2 SHEETS—SHEET 2.
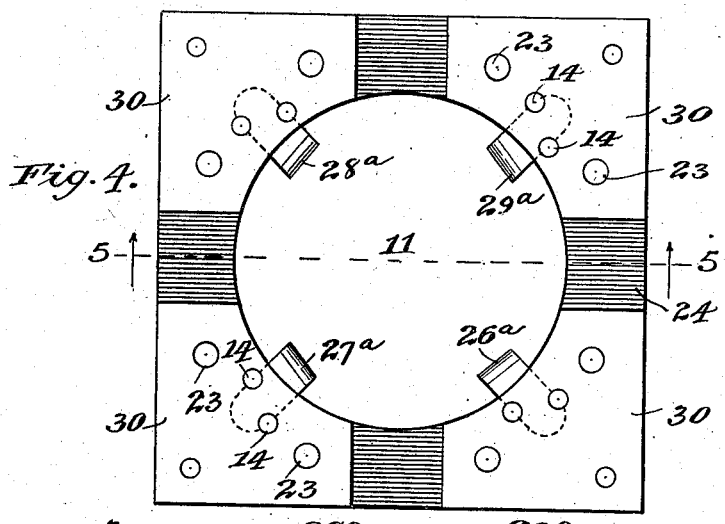
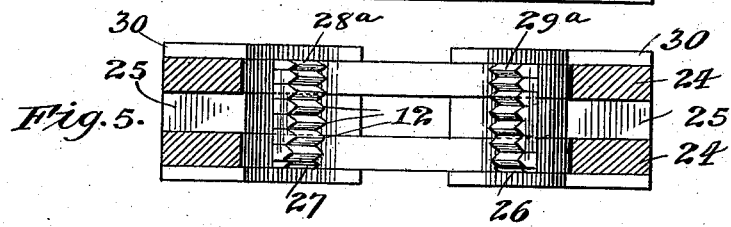
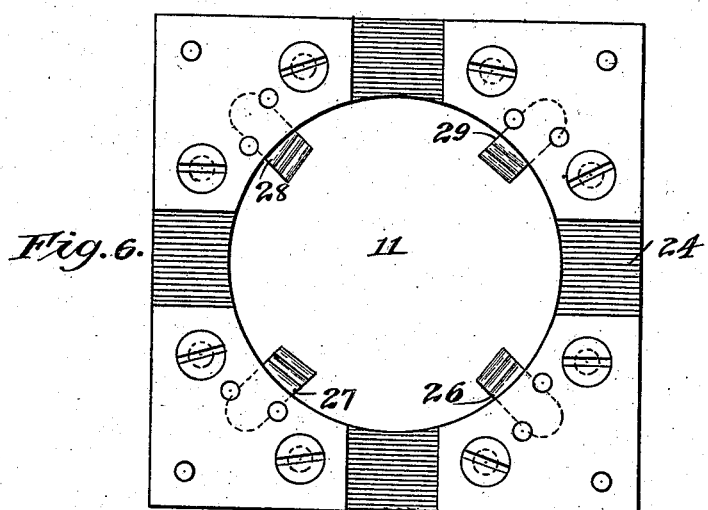

UNITED STATES PATENT OFFICE.

HENRY JANSEN, OF CHICAGO, ILLINOIS.

THREADING-TOOL.

No. 881,406.  Specification of Letters Patent.  Patented March 10, 1908.

Application filed May 20, 1907. Serial No. 374,619.

*To all whom it may concern:*

Be it known that I, HENRY JANSEN, a citizen of the United States, and a resident of Chicago, in the county of Cook and State of Illinois, have invented certain new and useful Improvements in Threading - Tools, of which the following is a specification.

This invention relates to threading tools commonly known as dies and taps employed for cutting external and internal screw threads on bolts, pipes, nuts, and similar articles; and the invention pertains more particularly to improvements in the manner and means of forming and securing the cutting teeth of these tools. In the common forms of dies and taps at present in use, the radially projecting teeth are formed integral with the body of the die or tap, which construction has two leading disadvantages. In the first place, it is difficult to form the cutting teeth accurately and on a true pitch line and with sharp edges; and in the second place, and especially in the case of threading dies, when the teeth become dull or worn to a point where they are ineffective, the entire tool is discarded, owing to the difficulty and practical impossibility of resharpening the teeth.

My invention has for its leading object to obviate the aforementioned difficulties, and as a consequence cheapen the cost of these tools.

A further object of the invention is to provide a tool of superior efficiency and accuracy. These objects are attained by the present invention, which has for its leading novel feature the provision of teeth that are separable from the body of the die or tap and are capable, when worn or dulled, of being removed, resharpened, and accurately replaced in the tool. These teeth are rigidly secured in slots or similar openings formed in the body of the tool by pins or keys which may be readily withdrawn to permit the removal of the tool for resharpening.

In the accompanying drawings I have illustrated the principle of my invention as embodied in a threading die adapted to cut external screw threads on bolts, pipes and the like; but it will be understood that the principle of the invention is equally applicable to the reverse form of tool known as a threading tap, adapted for the cutting of internal threads, and in its broad aspects the invention relates to and covers a tap as well as a die.

Referring to the drawings,—Figure 1 is a plan view of the rear or back side of a threading die embodying one form of the invention. Fig. 2 is a cross-sectional view on the line 2—2 of Fig. 1 looking in the direction indicated by the arrows. Fig. 3 is a front or face view of the same die. Figs. 4, 5 and 6 are views corresponding with Figs. 1, 2 and 3, respectively, of a modified form of die embodying my invention, Fig. 5 being a view on the section line 5—5 of Fig. 4. Figs. 7 and 8 are detail side and edge views, respectively, of an individual cutting tooth; and Fig. 9 is a diagrammatic view illustrating the relative arrangement and pitch line relations of the four rows or series of teeth employed in the die.

Referring first to Figs. 1, 2 and 3, 10 designates the body of the die, herein shown as a plain rectangular metal block having parallel flat sides and containing a central circular opening 11 formed therethrough, adapted for the passage of the object or article to be threaded by the tool. The four corner portions of the die-body are formed with radially directed slots extending some distance inwardly from the margin of the circular opening 11. In these slots are seated and snugly fitted corresponding stacks or series of individual threading teeth shown at 12, one of said teeth being illustrated in detail in Figs. 7 and 8. The teeth are provided on one or both edges with notches, such as are shown at 13 in Figs. 7 and 8 adapted for the reception of pins or keys 14 whereby to lock the teeth against endwise displacement relatively to their containing slots or seats; the teeth shown in Figs. 1, 2 and 3 having the keys applied wholly on one side, while those illustrated in Figs. 4, 5 and 6 have the keys applied, one on each side. The teeth of each series or stack are confined laterally by means of corner plates 15, 16, 17 and 18 on the face thereof, and similar corner plates 19, 20, 21, and 22 on the back or reverse side thereof. The corner plates are preferably, and as herein shown, themselves equipped with the first and last teeth of each series; and, in order to secure the pitch-line arrangement of the teeth and, at the same time, provide flat parallel outer surfaces or sides on the die, the corner plates of each series are made of graduated thickness, and are all, except the thinnest of each series, inset into the face of the die-body, as shown in Fig. 2, wherein it will be seen that the thinnest plate 15 of the first series rests directly upon the face of the die-block and is provided with a narrow initial tooth 15ª; the next thinnest plate 16 is slightly inset in the face of the block and is provided with an integral initial tooth 16ª. The corner plate 17 is slightly thicker than the corner plate 16 and is inset into the block a correspondingly greater distance and is provided with an initial cutting tooth 17ª; while the remaining corner plate 18 is of substantially the full thickness of a cutting tooth, and is inset deepest into the block, and carries an initial tooth 18ª. The corner plates 19, 20, 21 and 22 on the back of the die-block are similarly formed but inversely arranged. That is to say, the thickest corner plate 22 of the back series lies opposite the thinnest corner plate 15 of the front series, and vice versa; these back corner plates being provided with corresponding final cutting teeth 19ª, 20ª, 21ª and 22ª, respectively. In this manner the teeth of the successively operating rows are slightly offset relatively to each other longitudinally of the bore of the tool as is required to locate them in the proper pitch-line. In order to effect the introduction and initial grip or bite of the tool upon the pipe, bolt, or other article to be threaded, the first two or three teeth of each series on the face or entering side of the die are ground down or beveled off so as to relatively enlarge the diameter of the entering face of the die; this formation of the teeth being indicated in Figs. 2 and 3, wherein the teeth 15ª, 16ª, 17ª and 18ª are shortest; the next teeth 12ª are somewhat longer than the initial teeth, but shorter than the full teeth 12; while the third tooth of each series is of full cutting size and length.

The opposite pairs of plates on each corner of the die-block are rigidly secured to each other and to the block by suitable fastening means, preferably flat-head rivets 23, which suffice to preserve the smooth flat surfaces of the opposite sides of the die, and yet may be readily driven out with a suitable tool when necessary to remove the teeth.

Figs. 4, 5, and 6 illustrate a modified skeleton form of die-block or holder, which nevertheless embodies the constructional principle of the invention as hereinabove set forth and described in connection with Figs. 1, 2 and 3. In this form of the invention I employ a pair of duplicate parallel rectangular plates 24, which are radially slotted at the four corners thereof and inwardly of the central circular opening formed therethrough; and between said plates at each of the four corners thereof I interpose a spacing and filling block 25 that is similarly slotted to register with the slots of the plate 24. In the seats thus formed by these slots are packed the several series of full cutting teeth 12, as already described in connection with Figs. 1, 2 and 3; and in addition thereto, at the ends of each series, I provide teeth of graduated thickness indicated by 26, 27, 28 and 29 on the entering side of the series, and corresponding but inversely arranged graduated teeth 26ª, 27ª, 28ª and 29ª on the back or reverse side of the series. This arrangement throws the full cutting teeth of the several series into proper pitch-line with each other; and the teeth are confined laterally by plain corner plates 30 of uniform thickness applied to the outer sides of the main body or frame-plates 24, which latter, in connection with the filling and spacing blocks 25, make up the die-block or body. The initial cutting teeth 26, 27, 28, and 29 on the entering side of the die are made shorter, as above explained, to enlarge the diameter of the mouth of the die; and the next teeth behind said initial cutting teeth are also somewhat shortened to produce the desired tapering effect on the mouth of the die, as is well understood in dies of this character. The graduation of the initial cutting teeth as to thickness, whereby the full cutting teeth of the several series or rows are thrown into offset or pitch-line relation, is illustrated in the diagrammatic view shown by Fig. 9, wherein the four rows or series of teeth are projected onto a plane surface, the parallelism of the sides of the die-block represented by the two series of corner plates being also illustrated therein.

The plates 24, filling blocks 25, and corner plates 30 are rigidly united preferably by means of flat-head rivets 23 countersunk in corner plates, as hereinabove specified. It would, of course, be practicable to use, with this form of die-block, corner plates of graduated thickness carrying the initial and final teeth of each series, as described in connection with Figs. 1, 2 and 3, if desired.

It will be observed that by reason of the manner and means of forming and securing the cutting teeth of the tool as hereinabove described and illustrated in the drawings, it is possible and feasible to remove the teeth from the die-block when found necessary or desirable, accurately resharpen them, and replace them, thus making the tool practically as good as new and greatly increasing its longevity. Furthermore, when one set of teeth have been used and resharpened until worn too short for further use, they can be replaced by new teeth without discarding the die-block or frame, the life of which latter is thus practically unlimited. The accurate pitch-line relation of the teeth can also be more readily secured where the teeth are independently formed and assembled, as in my device, than where formed integrally with the die-block.

It will be evident to those skilled in the art that other specific modes and means of removably securing detachable teeth in a threading tool of the character described will readily suggest themselves from the disclosures herein made, and hence I do not limit the invention to the particular forms shown and described, except to the extent clearly indicated in specific claims.

I claim:

1. A threading tool consisting of a tooth-holder having radial slots formed therein, and a series of detachable individual threading teeth seated and rigidly secured in each of said slots, substantially as described.

2. A threading tool consisting of a tooth-holder having radial slots formed therein, a series of detachable individual threading teeth seated and rigidly secured in each of said slots, and clamp plates on one or both sides of said tooth-holder having integral teeth located in alinement with the individual threading teeth of each series, substantially as described.

3. A threading die consisting of a die-block or frame having parallel flat sides and a central opening formed therethrough and further provided with a plurality of radially directed slots at their inner ends communicating with said opening, a group of individual threading teeth seated and detachably secured in each of said slots, and clamp-plates applied to the opposite sides of the die-block and overlying said slots whereby to confine said teeth against lateral displacement, the clamp plates on one or both sides of said die-block having integral teeth located in alinement with the individual threading teeth of each group substantially as described.

HENRY JANSEN.

Witnesses:
SAMUEL N. POND,
FREDERICK C. GOODWIN.